(12) United States Patent
Chung et al.

(10) Patent No.: US 9,665,209 B2
(45) Date of Patent: *May 30, 2017

(54) POINTING DEVICE FOR INTERACTING WITH TOUCH-SENSITIVE DEVICES AND METHOD THEREOF

(71) Applicant: Wai Lung David Chung, Hong Kong (HK)

(72) Inventors: Wai Lung David Chung, Hong Kong (HK); Hiu Kwan Lam, Hong Kong (HK)

(73) Assignee: Wai Lung David Chung, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/336,852

(22) Filed: Oct. 28, 2016

(65) Prior Publication Data

US 2017/0045998 A1 Feb. 16, 2017

Related U.S. Application Data

(63) Continuation of application No. 14/810,454, filed on Jul. 27, 2015, now Pat. No. 9,513,722, which is a continuation-in-part of application No. 14/284,379, filed on May 21, 2014, now Pat. No. 9,489,059.

(30) Foreign Application Priority Data

Jun. 7, 2013 (HK) .................................. 13106809

(51) Int. Cl.
*G06F 3/041* (2006.01)
*G06F 3/0354* (2013.01)

(52) U.S. Cl.
CPC ........ *G06F 3/0416* (2013.01); *G06F 3/03545* (2013.01); *G06F 3/0414* (2013.01); *G06F 2203/04103* (2013.01); *G06F 2203/04104* (2013.01)

(58) Field of Classification Search
CPC .. G06F 3/03545; G06F 3/0416; G06F 3/0414; G06F 2203/04103; G06F 2203/04104
See application file for complete search history.

(56) References Cited

U.S. PATENT DOCUMENTS 8,358,286 B2 * 1/2013 Cannon ................... A63F 13/02
345/174
2011/0095992 A1 * 4/2011 Yeh ..................... G06F 3/03543
345/173

* cited by examiner

*Primary Examiner* — Latanya Bibbins

(57) ABSTRACT

The present application is directed to a pointing device and a method for interacting with touch-sensitive devices. The pointing device includes a supporting member, first and second contact points fixed on the supporting member and adapted to be in contact with a touch-sensitive layer in a default state, and at least one movable contact point mounted on the supporting member and movable from the default state to a fully depressed state adjacent to the second contact point to form a combined touch area on the touch-sensitive layer having an offset center that is offset from a center of the second contact point so that the second touch point is shifted to an offset position in alignment with the offset center.

19 Claims, 11 Drawing Sheets

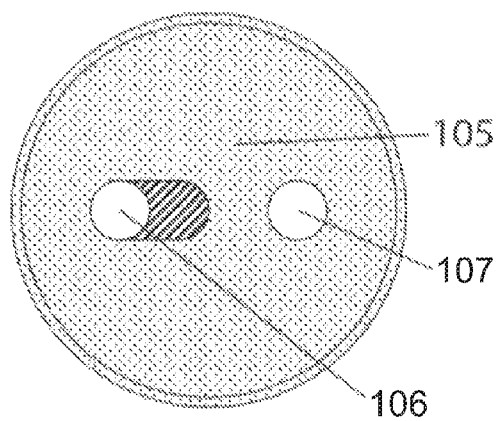
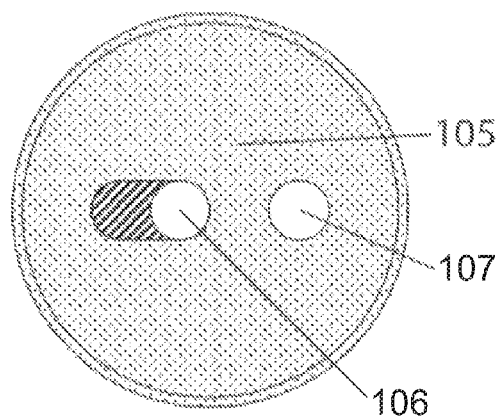
FIG. 1b          FIG. 1c
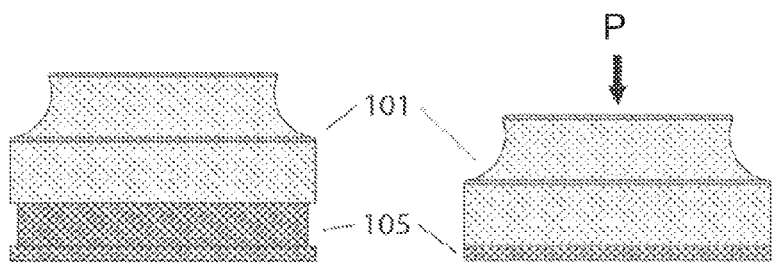
FIG. 1d          FIG. 1e

POINTING DEVICE FOR INTERACTING WITH TOUCH-SENSITIVE DEVICES AND METHOD THEREOF

CROSS-REFERENCE TO RELATED APPLICATIONS

This patent application is a continuation of patent application Ser. No. 14/810,454 filed on Jul. 27, 2015, which is a continuation-in-part of patent application Ser. No. 14/284,379 filed on May 21, 2014, which claims the benefit of Hong Kong Short-term Patent Application No. 13106809.3 filed on Jun. 7, 2013; the contents of which are hereby incorporated by reference.

FIELD OF INVENTION

The present application refers to a pointing device to be used on touch screens, more particularly, to a pointing device and a method for interacting with touch-sensitive devices.

BACKGROUND OF INVENTION

Touch-sensitive devices are gaining tremendous popularity in today's consumer electronics market. Such devices are playing important roles in people's daily lives. In the past, pointing devices such as mice and trackballs are commonly used for navigating on the user interface of computers. The buttons of these traditional pointing devices only acknowledge on/off input from the user and are incorporated with complex mechanical/electronic constructions which incurred substantial costs in manufacturing. Moreover, these pointing devices require the user to learn and to get used with the controls through some period of practice. All in all, these pointing devices fail to provide an intuitive way for the user to interact with electronic devices. The present application provides a pointing device to be used on most touch-sensitive devices such as the Apple iPad® which mitigates the inconsistencies and inaccuracies caused by using bare fingers on touch-sensitive devices and allows the control of a range of values by varying the pressure by the user. Further, the present application provides an intuitive way for the user to interact with the touch-sensitive devices.

SUMMARY OF INVENTION

According to one aspect, there is provided a pointing device for interacting with a touch-sensitive device including a supporting member, a first contact point fixed on the supporting member and adapted to be in contact with a touch-sensitive layer and generate a first touch point on a screen underneath the touch-sensitive layer, a second contact point fixed on the supporting member and spaced laterally apart from the first contact point and adapted to be in contact with the touch-sensitive layer and generate a second touch point on the screen, and a third contact point mounted on the supporting member and movable by a first actuating assembly from a default state where only the first and second contact points are in contact with the touch-sensitive layer to its fully depressed state where the third contact point is also in contact with the touch-sensitive layer adjacent to the second contact point.

When the first, second and third contact points are in contact with the touch-sensitive layer, the second and third contact points are recognized as one contact point and produce a first combined touch area on the touch-sensitive layer having a first offset centre that is offset from a centre of a touch area on the touch-sensitive layer of the second contact point so that the second touch point is shifted to a first offset position in alignment with the first offset centre.

In one embodiment, the first actuating assembly may include a first actuating member provided on a first raised platform of the supporting member, and having an upper end provided with a first actuating button and a lower end coupled with the third contact point disposed below the first raised platform; and a first biasing member mounted on the first actuating member and held between the first actuating button and the first raised platform for biasing the third contact point underneath the first raised platform. When a force is exerted on the first actuating button against biasing force of the first biasing member, the third contact point moves to its fully pressed state.

In one embodiment, the first actuating member may be a first shaft passing through a first opening formed on the first raised platform, and the first biasing member can be a coil spring.

The pointing device may further include a fourth contact point mounted on the supporting member and movable by a second actuating assembly from the default state where only the first and second contact points are in contact with the touch-sensitive layer to its fully depressed state where the fourth contact point is also in contact with the touch-sensitive layer adjacent to the second contact point. When the first, second and fourth contact points are in contact with the touch-sensitive layer, the second and fourth contact points are recognized as one contact point and produce a second combined touch area on the touch-sensitive layer having a second offset centre that is offset from the centre of the touch area of the second contact point so that the second touch point is shifted to a second offset position in alignment with the second offset centre. When the first, second, third and fourth contact points are in contact with the touch-sensitive layer, the second, third and fourth contact points are recognized as one contact point and produce a third combined touch area on the touch-sensitive layer having a third offset centre that is offset from the centre of the touch area of the second contact point so that the second touch point is shifted to a third offset position in alignment with the third offset centre.

In one embodiment, the second actuating assembly may include a second actuating member provided on a second raised platform of the supporting member, and having an upper end provided with a second actuating button and a lower end coupled with the fourth contact point disposed below the second raised platform; and a second biasing member mounted on the second actuating member and held between the second actuating button and the second raised platform for biasing the fourth contact point underneath the second raised platform. When a force is exerted on the second actuating button against biasing force of the second biasing member, the fourth contact point moves to its fully pressed state.

In one embodiment, the second actuating member may include a second shaft passing through a second opening formed on the second raised platform, and the second biasing member can be a coil spring.

In one embodiment, a plurality of changes in displacement of the second touch point relative to the first touch point may define a variety of patterns of movements which are detected and recognized by the touch-sensitive device.

In one embodiment, data values of a list of the patterns can be stored in a data file which is accessible by executable applications on the touch-sensitive device.

The pointing device may further include at least one additional contact point mounted on the supporting member and movable by at least one additional actuating assembly from the default state where only the first and second contact points are in contact with the touch-sensitive layer to its fully depressed state where the at least one additional contact point is also in contact with the touch-sensitive layer adjacent to the second contact point.

According to another aspect, there is provided a method for interacting with the touch-sensitive device using the pointing device mentioned above. The method may include the step of placing the pointing device on the screen at the default state where only the first and second contact points are in contact with the touch-sensitive layer to thereby generate the first and second touch points on the screen respectively.

In one embodiment, the method may include the step of pressing the first actuating assembly so that the third contact point is in contact with the touch-sensitive layer to thereby shift the second touch point to the first offset position.

According to yet another aspect, there is provided a method for interacting with the touch-sensitive device using the pointing device mentioned above. The method may include the step of placing the pointing device on the screen at the default state where only the first and second contact points are in contact with the touch-sensitive layer to thereby generate the first and second touch points on the screen respectively.

The method may further include the step of pressing the first actuating assembly so that the third contact point is in contact with the touch-sensitive layer to thereby shift the second touch point to the first offset position.

The method may further include the step of pressing the second actuating assembly so that the fourth contact point is in contact with the touch-sensitive layer to thereby shift the second touch point to the second offset position.

The method may further include the step of pressing the first and second actuating assemblies simultaneously so that the third and fourth contact points are in contact with the touch-sensitive layer respectively to thereby shift the second touch point to the third offset position.

The method may further include the steps of (i) pressing the first actuating assembly so that the third contact point is in contact with the touch-sensitive layer to thereby shift the second touch point to the first offset position; and then (ii) pressing the second actuating assembly so that the fourth contact point is in contact with the touch-sensitive layer to thereby shift the second touch point from the first offset position to the third offset position.

The method may further include the steps of (i) pressing the second actuating assembly so that the fourth contact point is in contact with the touch-sensitive layer to thereby shift the second touch point to the second offset position; and then (ii) pressing the first actuating assembly so that the third contact point is in contact with the touch-sensitive layer to thereby shift the second touch point from the second offset position to the third offset position.

The method may further include the steps of determining and recording positions of the first and second touch points, determining a change in displacement of the second touch point, determining a distance between the first and second touch points, comparing a value of the distance with a list of preset values stored in a data file, and triggering a command if the value of the distance matches a preset value.

BRIEF DESCRIPTION OF DRAWINGS

FIG. 1b shows a bottom view of the pointing device of an embodiment of the present application in its default state;

FIG. 1c shows a bottom view of the pointing device of an embodiment of the present application with the housing is fully depressed;

FIG. 1d shows a side view of the pointing device of an embodiment of the present application in its default state;

FIG. 1e shows a side view of the pointing device of an embodiment of the present application with the housing is fully depressed;

DETAILED DESCRIPTION

The present application refers to a pointing device for interacting with touch-sensitive devices and a method for interacting with touch-sensitive devices.

The pointing device may be used for navigating on a touch-sensitive device, or as a component of an entertaining system used with touch-sensitive devices. The pointing device provides up to four types of inputs to the touch-sensitive device, namely, (1) positioning of the device with reference to the screen coordinates; (2) pointing direction of the device; (3) a command actuated by depressing the housing; (4) a continuous range of values when the button is being gradually depressed.

Identification of the pointing device is based on the patterns and the displacements of touch points before-and-after the housing is fully pressed by the user. The structure and components of the pointing device will be discussed in the following.

Figure 1A:
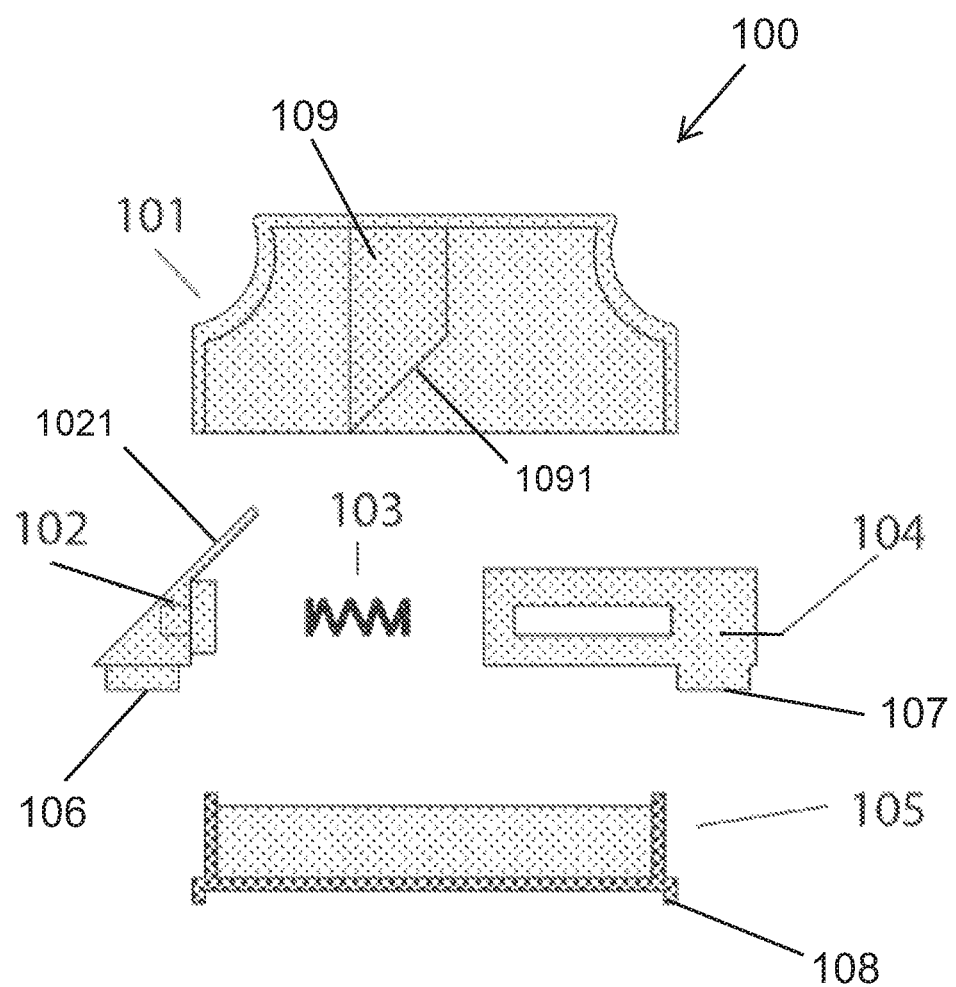
FIG. 1a shows an exploded sectional view of the pointing device of an embodiment of the present application.
Figure 2A:
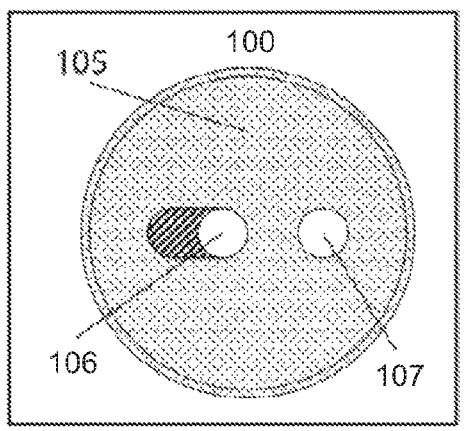
FIG. 2a-2f show examples of embodiment of the present application with different patterns of movement of contact points.
Figure 2B:
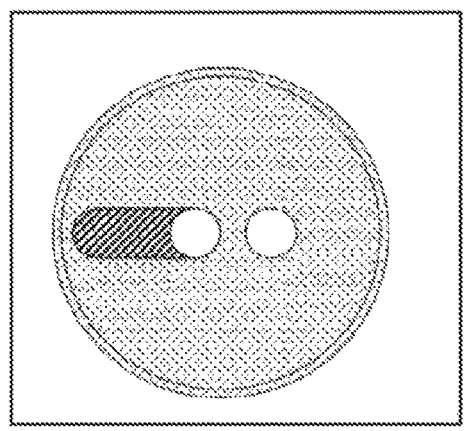
Figure 2C:
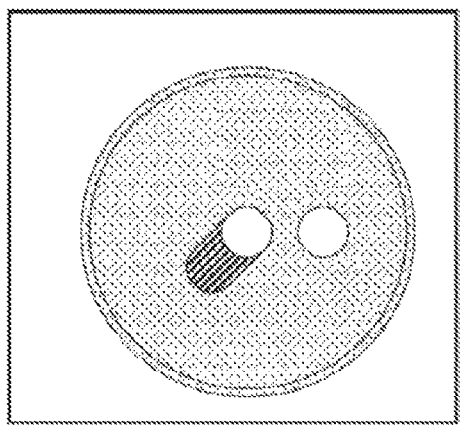
Figure 2D:
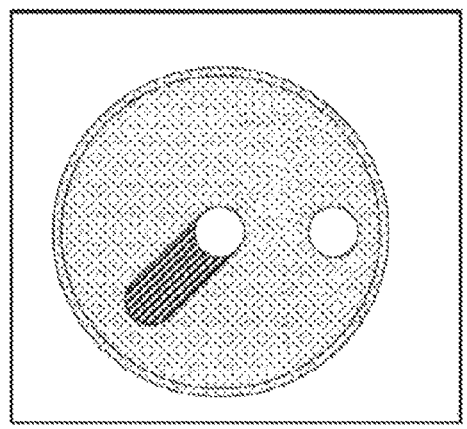
Figure 2E:
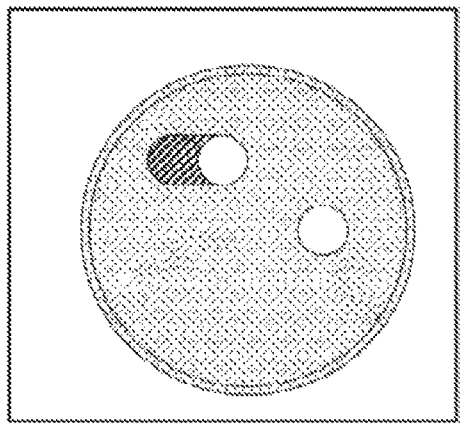
Figure 2F:
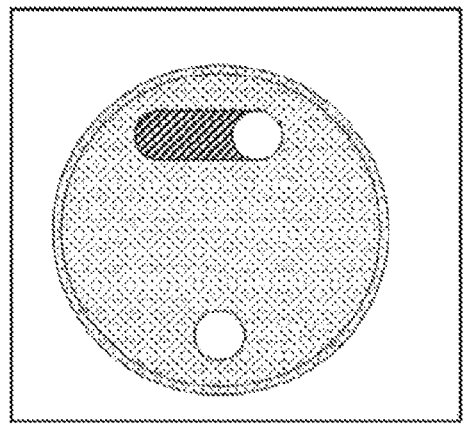

An exploded view of the device 100 is shown in FIG. 1a. A housing 101 houses all the components and covers a portion of a base 105. The base 105 may be non-conductive. An opening is formed on the bottom of the housing 101 to receive the base 105. The base 105 is formed in a way so that it is coupled with the opening of housing 101 while a portion of the base 105 is inserted into the housing 101.

As shown in FIGS. 1b and 1c, a plurality of apertures is provided on the base 105 in accordance with the designated pattern associated with a particular pointing device. A sliding member 102 and a supporting member 104 are provided with contact points 106 and 107 respectively. The contact points 106 and 107 are inserted into and through the apertures provided on the base 105 such that the contact points can be in contact with the surface of the screen of a touch-sensitive device during use. It is appreciated that first contact point 106 is provided on the sliding member 102 and second contact point 107 is provided on the supporting member 104. Moreover, a protruded peripheral edge 108 is provided on the base 105. The contact points 106 and 107 protrude downwardly and are substantially flush (i.e. at the same height) with the bottom of the protruded peripheral edge 108 in order to be in contact with the screen during use.

In FIG. 1a, an actuating member 109 is provided in the housing 101 and has a slanted surface 1091 for engaging with the sliding member 102. The sliding member 102 is provided with a corresponding slanted surface 1021. A biasing member 103 in form of a helical spring, as a non-limiting example, is situated between the sliding member 102 and the supporting member 104. FIG. 1a shows an unassembled view of the pointing device 100 indicating the arrangement of the above-mentioned components. As a downward pressure is applied on the housing 101 by the user, actuating member 109 pushes downward and the slanted surface 1091 forces the sliding member 102 to move in the direction as shown in FIGS. 1b-1c. The supporting member 104 is fixedly mounted on the base 105 and causes the biasing member 103 in between to be compressed. Once the user releases the pressure on the housing 101, the biasing member 103 decompresses and pushes the sliding member 102 back to its default position. Further, the slanted surface 1021 of the sliding member 102 forces the housing 101 to rise to its default position. As the sliding member 102 moves, the first contact point 106 displaces relative to the second contact point 107 which is formed with the supporting member 104. FIG. 1d and FIG. 1e illustrate the device 100 when pressure is applied.

Figure 3:
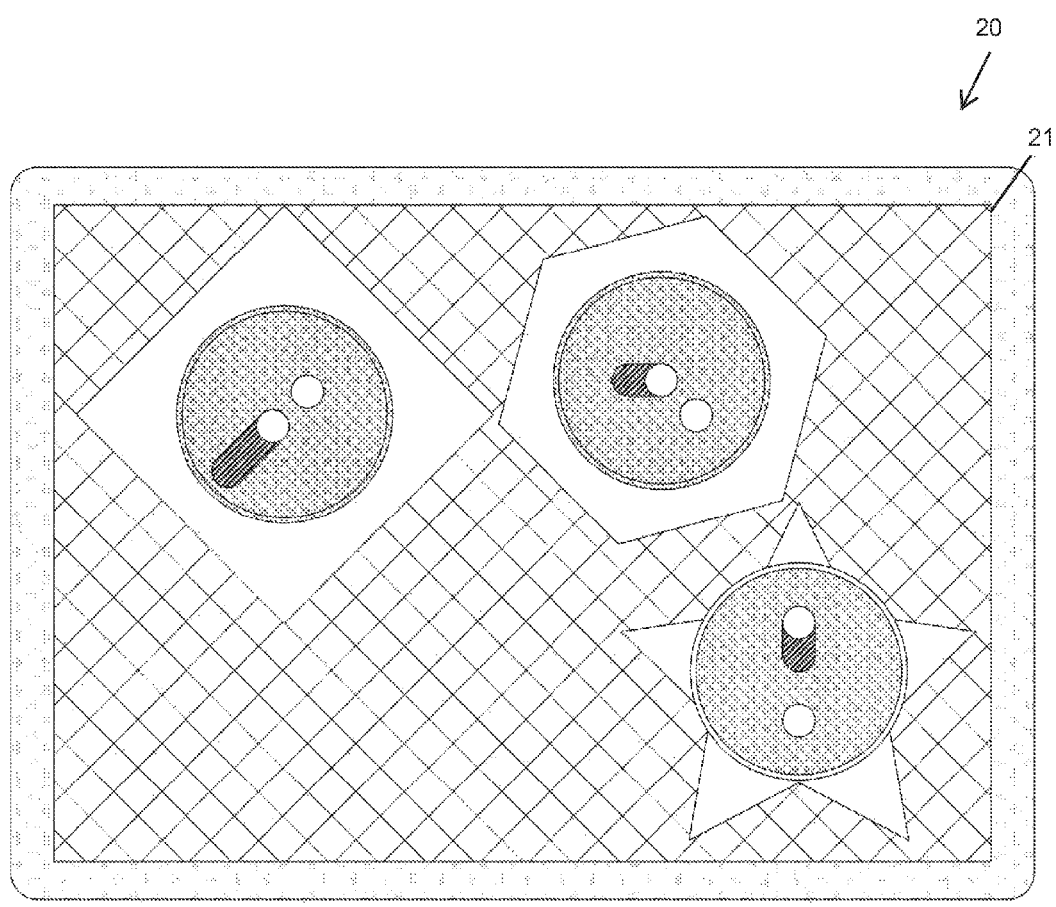
FIG. 3 shows an example of three pointing devices of different patterns being used on a touch-sensitive device.

When the pointing device 100 is placed on a screen of a touch-sensitive device and pressure is applied on the housing 101, i.e., the housing is being fully pressed downward, the contact points 106, 107 are pressed against and in contact with the surface of the screen and causes first contact point 106 to slide relative to second contact point 107. The sliding movement of first contact point 106 relative to second contact point 107 forms a pattern which is detected and recognized by the touch-sensitive device. Once the movement pattern is detected by the touch-sensitive device, subsequent actions may be executed to indicate the system acknowledged the input, for a non-limiting example, an image corresponds to that particular device 100 may be displayed on the screen 21 as shown in FIG. 3. It is appreciated that data values of a list of patterns are stored in the data file which is accessible by executable applications on the touch-sensitive device 20.

FIGS. 2a-2f show a variety of patterns of movements of the first contact point 106 relative to second contact point 107. These unique patterns are individually recognized by the touch-sensitive device according to the data values in a predetermined list of patterns as mentioned. Details of how the patterns are interpreted by the touch-sensitive device will be discussed in the following.

Figure 4A:
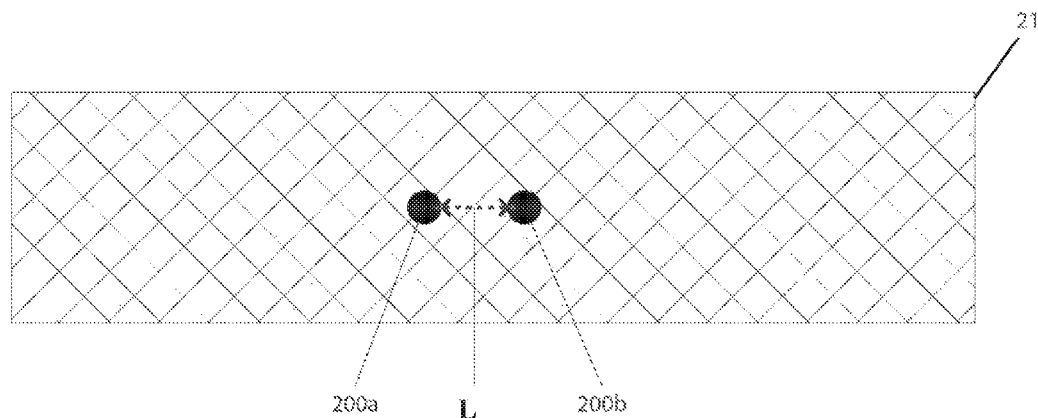
FIG. 4a shows the touch points detected on the screen by the touch-sensitive device where the pointing device is in its default state.

Reference is made to FIG. 4a. For a non-limiting example, the two contact points 106 and 107 of the pointing device 100 are in contact with the screen 21, positions in terms of X and Y coordinates of the two touch points 200a and 200b on the screen 21 are detected and registered by the touch-sensitive device 20.

Figure 4B:
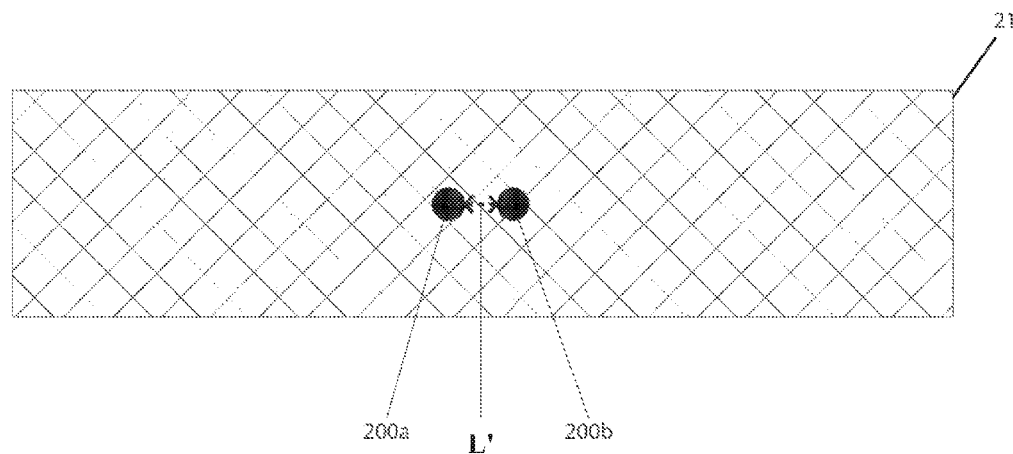
FIG. 4b shows the touch points detected on the screen by the touch-sensitive device where the pointing device's housing is fully depressed.
Figure 6A:
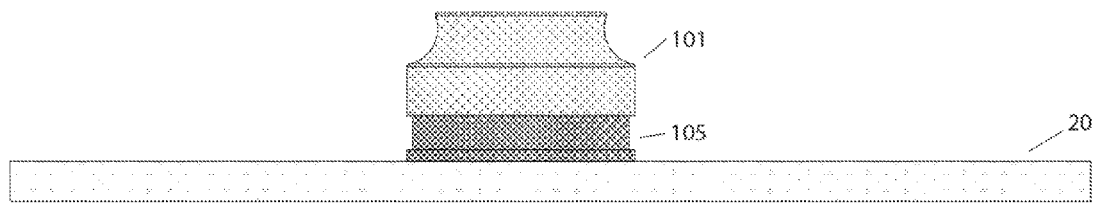
FIGS. 6a and 6b show an elevation view and a cutaway view of the pointing device and the default positions of the contact points before the housing is pressed down.
Figure 6B:
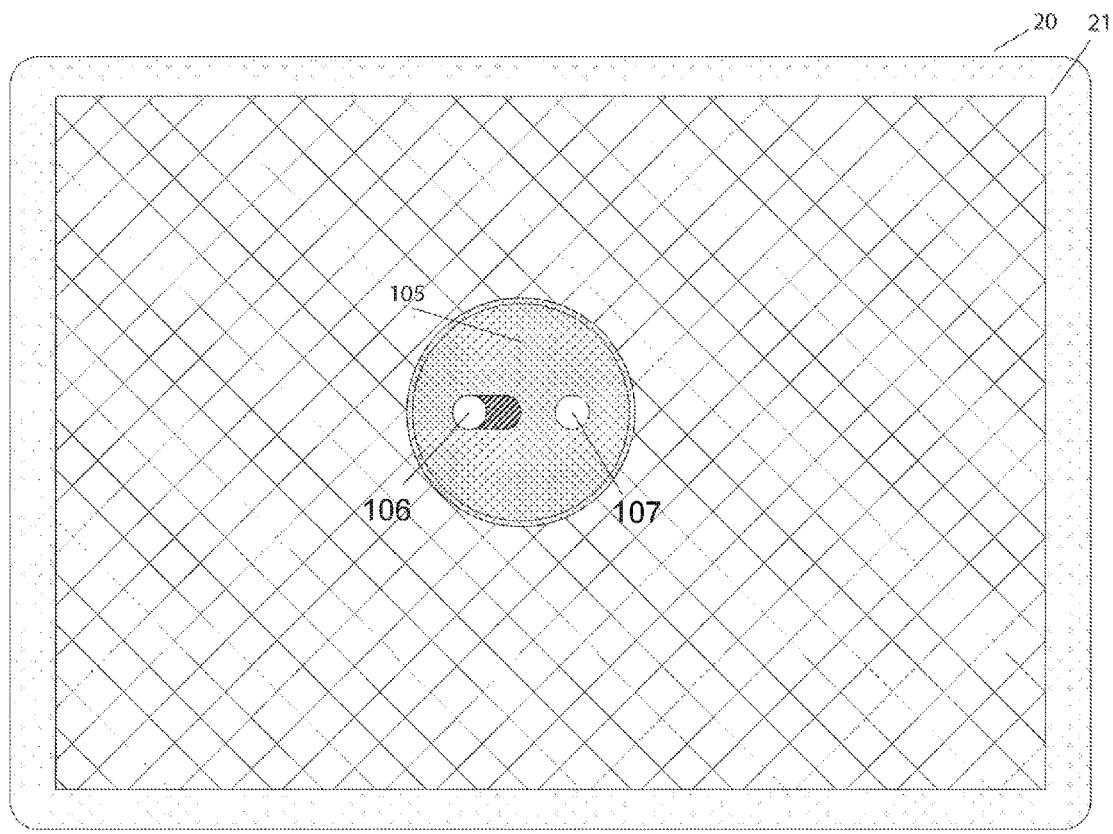
Figure 7A:
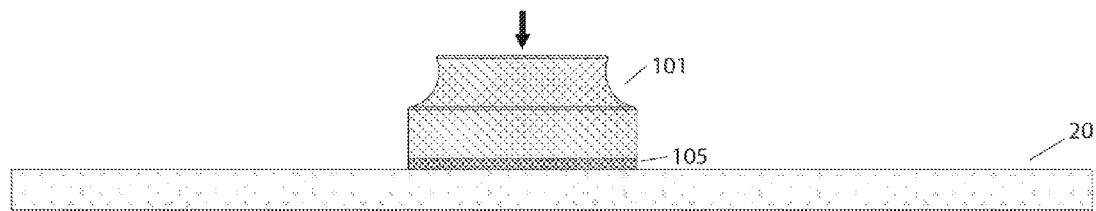
FIGS. 7a and 7b show an elevation view and a cutaway view of the pointing device and the positions of the contact points when the housing is pressed down by a user.
Figure 7B:
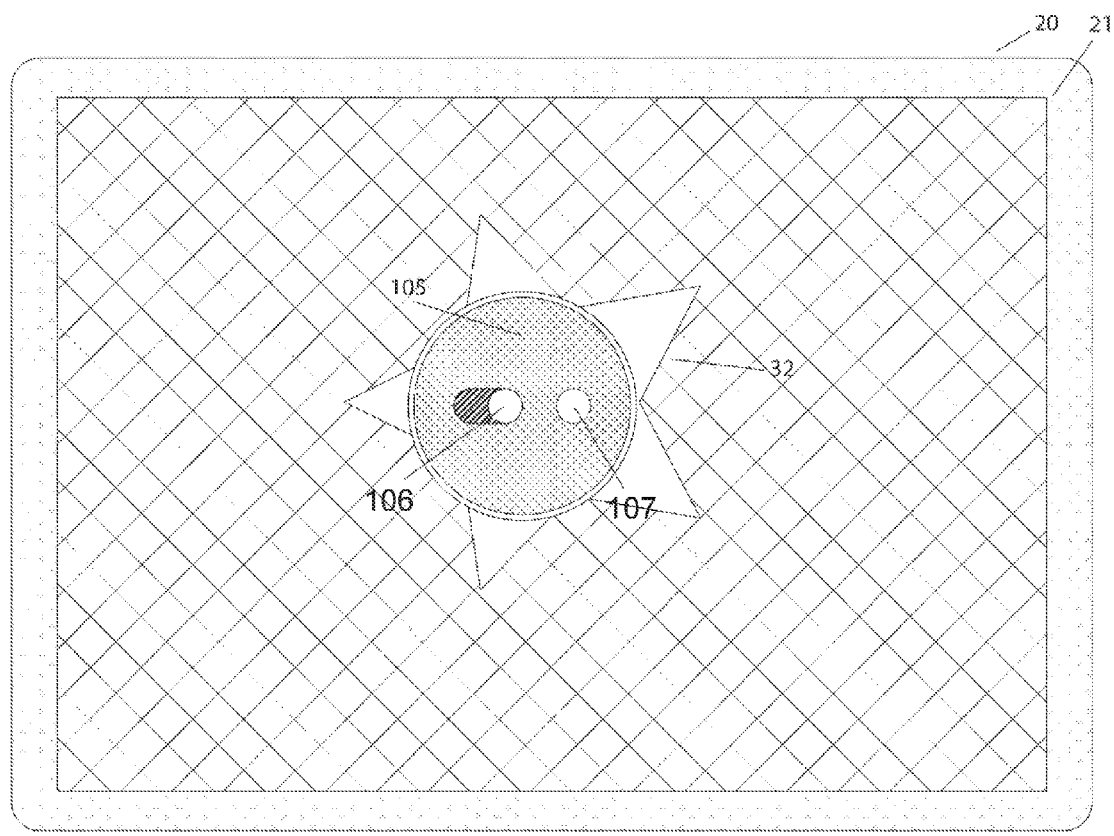

When housing 101 is depressed, the movable first contact point 106 slides to a direction relative to second contact point 107. In the example, first contact point 106 moves closer to second contact point 107 in a horizontal direction as shown in FIG. 4b. It is appreciated that the touch points 200a and 200b correspond to the movements of contact points 106 and 107. FIGS. 6a and 6b show an elevation view and a cutaway view of the device and the default positions of the contact points 106 and 107 before the housing 101 is pressed down, while FIGS. 7a and 7b show an elevation view and a cutaway view of the device and the positions of the contact points 106 and 107 when the housing 101 is pressed down by a user. An image example 32 is displayed on the screen 21 indicating the pointing device 100 is identified by the touch-sensitive device based on the list of patterns stored in the data file.

Figure 5:
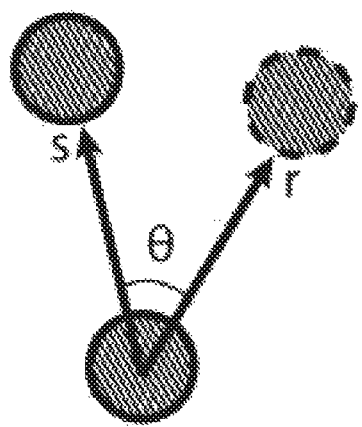
FIG. 5 shows the change of pointing direction of the device.

Referring to FIG. 5, assume the movable contact point is being recognized and the corresponding finger IDs are matched and recorded. Regardless of the state of the pointing device, the pointing direction of the device is determined by vector s generated by the current positions of the two contact points with reference to vector r generated by the last recorded positions of the two contact points. The degree of rotation of the pointing device depends on angle θ in-between vector r and vector s. For example, if there is an image attached with the position of the device, the orientation changes depending on angle θ in-between vector r and vector s, indicating the change of pointing direction of the device.

The two individual touch points 200a and 200b are differentiated by the absolute delta change in displacement of each touch point with reference to its previous position recorded, i.e., before any change of displacement takes place.

Let x1, y1 and x2, y2 be the x and y coordinates of touch points 200a and 200b of their previous positions respectively (the housing is not pressed down), and let x1', y1' and x2', y2' be the x and y coordinates of touch points 200a and 200b of their current positions respectively (the housing is fully pressed down). Accordingly, the absolute change in displacement of touch point 200a, ΔD1, may be determined by:

$$\Delta D_1 = \sqrt{|(x_1'-x_1)^2+(y_1'-y_1)^2|}$$

While the absolute change in displacement of touch point 200b, ΔD2, may be determined by:

$$\Delta D_2 = \sqrt{|(x_2'-x_2)^2+(y_2'-y_2)^2|}$$

As second contact point 107 (touch point 200b) in the above example is a fixed contact point, ΔD2 is theoretically 0.

The value of ΔD1 reflects the pressure act on the housing 101 on the screen 21. The more pressure is act on the housing, the farther the sliding member 102 travels and higher the value of ΔD1 is resulted. The change of the pressure level acting on the housing 101 is transformed to numerical values for controlling a range of values on the touch-sensitive device. For examples, the change of the pressure level may be used for controlling sliders or scrolling pages.

In order for the touch-sensitive device to identify and distinguish a specific pointing device, the direct distance between the touch points is determined. L signifies the initial direct distance between the two touch points, i.e., 200a and 200b, and L' represents the direct distance between 200a and 200b after the housing 101 is fully depressed.

The values L and L' are then stored in the memory of the touch-sensitive device and routines are executed to compare these values with the preset values of $L_{max}$ and $L_{min}$ in the list of patterns in a data file. $L_{max}$ is the variable of the maximum allowed distance between the two touch points, and $L_{min}$ is the variable of the minimum allowed distance between the two touch points. The values of $L_{max}$ and $L_{min}$ of each pattern are unique and are accessible by executable applications. Upon comparison of these values and a match is found, a specific command may be executed. For a non-limiting example, a corresponding image of the particular device will be displayed to acknowledge the identification of the device as shown in FIG. 3.

Both L and L' allow maximum absolute error S by default 0.1 cm but not limited to this value.

To be validated, both L and L' must also satisfy the following equation:

$$|L_{measured} - L_{data}| \leq S$$

$L_{measured}$ represents either L or L'. $L_{data}$ represents either $L_{max}$ or $L_{min}$.

The above-mentioned pointing device and method of the present application utilize at least one movable touch point rather than two fixed touch points so that a $L_{max}$ and $L_{min}$ between the two touch points may be determined to serve the purpose of increasing the matching requirement of the recorded values with the preset values in the data file. Assuming only two fixed touch points are used, the recognition of patterns would merely base on the distance L between the two touch points. As a result, a user may easily imitate the touch point pattern by placing fingers on the screen. This is of particular significance when the pointing device is to be used in games and applications where the strict use of the device is essential.

The pointing device and method of the present application allow the determination of the position and orientation of the device on a touch-sensitive device with least number of touch points required. The same also allow interactive inputs by the user such as clicking, double clicking, sliding and scrolling, dragging and dropping of objects displayed on the screen of the touch-sensitive device. Furthermore, it is another advantage of the present application that multi-touch gestures can be simulated for interacting with designated applications on the touch-sensitive devices.

Apart from allowing the sliding member 102 with contact point 106 to move across the screen by adding pressure on housing 101, such action can be simulated by replacing the housing 101, actuating member 109, sliding member 102, and biasing member 103; and (2) extending the supporting member 104, as described below according to another embodiment of the pointing device shown in FIGS. 8-10 with like reference numerals represent like parts.

Figure 8A:
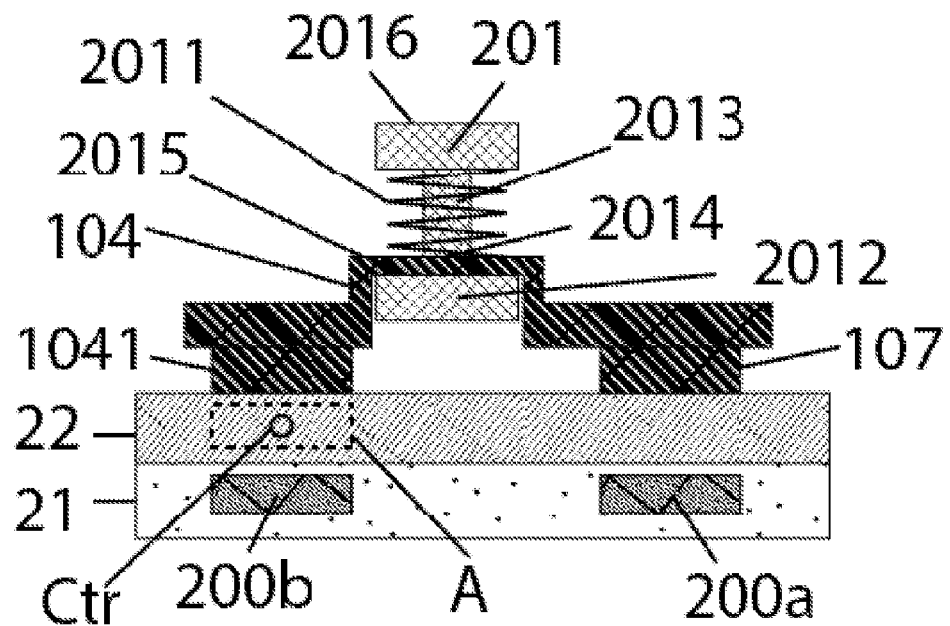
FIG. 8a shows a sectional view of the pointing device of another embodiment of the present application in its default state.

As shown in FIG. 8a, the pointing device 100 may include first, second and third contact points 107, 1041, 2012 mounted on a supporting member 104. As used herein, the terms "first", "second" and "third" etc. are not used to show a serial or numerical limitation but instead are used to distinguish or identify the various members of the device.

The first contact point 107 may be fixed on the supporting member 104 and adapted to be in contact with a touch-sensitive layer 22 and generate a first touch point 200a on a screen 21 underneath the touch-sensitive layer 22. The second contact point 1041 may be fixed on the supporting member 104 and spaced laterally apart from the first contact point 107 and adapted to be in contact with the touch-sensitive layer 22 and generate a second touch point 200b on the screen 21. The third contact point 2012 may be mounted on the supporting member 104 and movable by a first actuating assembly 201 from a default state where only the first and second contact points 107, 1041 are in contact with the touch-sensitive layer 22 to its fully depressed state where the third contact point 2012 is also in contact with the touch-sensitive layer 22 adjacent to the second contact point 1041, as shown in FIG. 8b.

When the first, second and third contact points 107, 1041, 2012 are in contact with the touch-sensitive layer 22, the second and third contact points 1041, 2012 can be recognized as one contact point and produce a first combined touch area A' on the touch-sensitive layer 22 having a first offset centre Ctr' that is offset from the centre Ctr of a touch area A on the touch-sensitive layer 22 of the second contact point 1041 so that the second touch point 200b is shifted to a first offset position in alignment with the first offset centre Ctr'.

The first actuating assembly 201 may include a first actuating shaft 2013 passing through a first opening 2014 formed on a first raised platform 2015 of the supporting member 104. The first actuating shaft 2013 may have an upper end provided with a first actuating button 2016 and a lower end coupled with the third contact point 2012 disposed below the first raised platform 2015. The first actuating assembly 201 may also include a first biasing member such as a coil spring 2011 mounted on the first actuating shaft 2013 and held between the first actuating button 2016 and the first raised platform 2015 for biasing the third contact point 2012 underneath the first raised platform 2015. When a force is exerted on the first actuating button 2016 against biasing force of the first biasing member 2011, the third contact point 2012 moves to its fully pressed state, as shown in FIG. 8b.

Figure 8B:
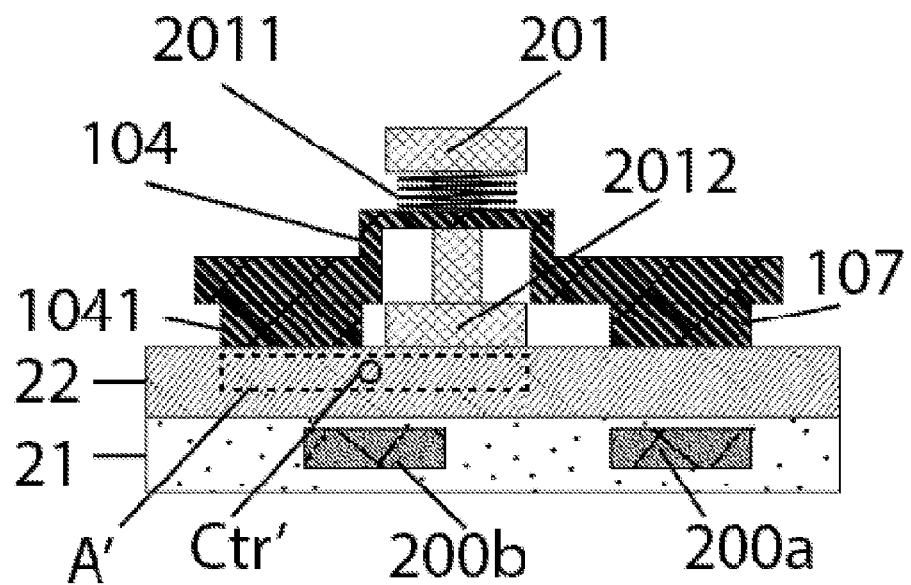
FIG. 8b shows a sectional view of the pointing device of the embodiment of FIG. 8a when the actuating member is pressed down by a user.

In FIG. 8b, by pressing down the actuating assembly 201 towards the screen 21, the three contact points 107, 1041 and 2012 touch the touch-sensitive layer 22. This third contact point 2012 will combine with the contact point 1041 as one contact point and inherit the finger ID of the contact point 1041. Since the distance between two contact points 1041 and 2012 is short, the touch action will be recognized as an extension of the touch area A of the same finger or contact point instead of an additional contact point. As a result, the touch point 200b will be gradually and steadily moving towards the designated offset position which is the centre Ctr' of touch area A'. This can ensure precise touch position and moving displacement every time the actuating assembly 201 is pressed. Once the user releases the pressure on the actuating assembly 201, the biasing member 2011 decompresses and pushes the actuating assembly 201 back to its default position. The touch point 200b will also be gradually and steadily moving back to its original position, which is the position of contact point 1041.

Figure 9A:
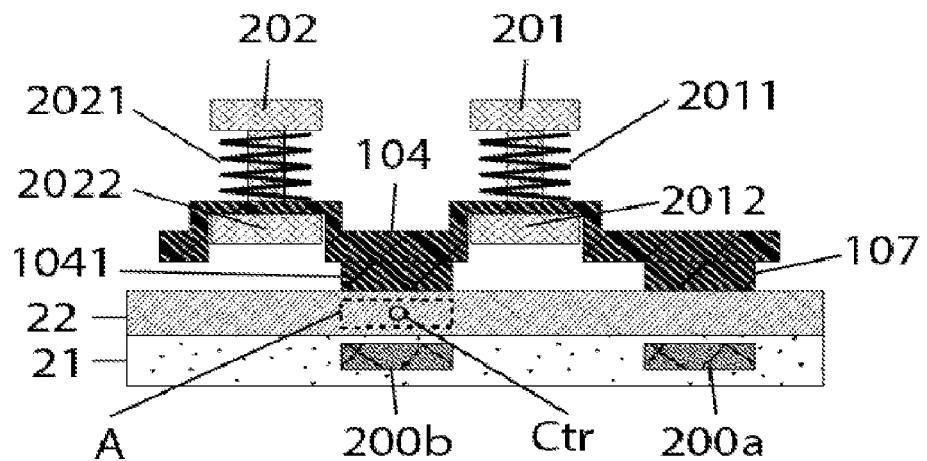
FIG. 9a shows a sectional view of the pointing device with more than one actuating member of another embodiment of the present application in its default state.
Figure 9B:
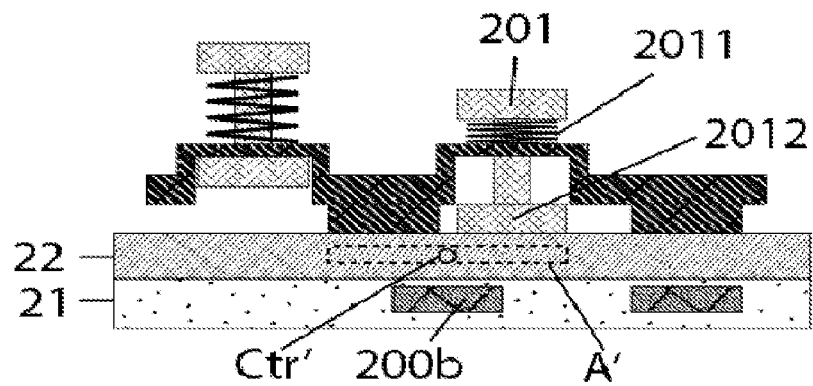
FIGS. 9b-9c show sectional views of the pointing device with more than one actuating member of the embodiment of FIG. 9a when one of the actuating members is pressed down by a user.
Figure 9C:
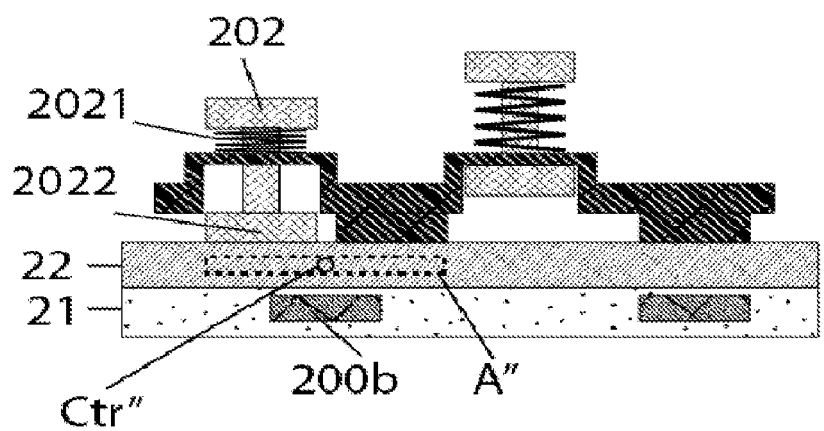

To allow more moving directions and moving displacements using the same pointing device 100, one or more actuating assemblies 201 can be added to the pointing device. FIGS. 9a-9c show that the pointing device 100 may be provided with two actuating assemblies 201 and 202. The structure of the second actuating assembly 202 may be the same as that of the first actuating assembly 201. In FIG. 9a, the pointing device 100 is in its default state with two contact points 107 and 1041 touching the touch-sensitive layer 22. As shown in FIG. 9b, when the first actuating assembly 201 is pressed towards the screen 21, touch point 200b shifts towards the position of contact point 2012. As shown in FIG. 9c, when the second actuating assembly 202 is pressed towards the screen 21, touch point 200b shifts towards the position of a fourth contact point 2022.

The fourth contact point 2022 may be mounted on the supporting member 104 and movable by the second actuating assembly 202 from the default state where only the first and second contact points 107, 1041 are in contact with the touch-sensitive layer 22 to its fully depressed state where the fourth contact point 2022 is also in contact with the touch-sensitive layer 22 adjacent to the second contact point 1041.

When the first, second and fourth contact points 107, 1041, 2022 are in contact with the touch-sensitive layer 22, the second and fourth contact points 1041, 2022 can be recognized as one contact point and produce a second combined touch area A" on the touch-sensitive layer 22 having a second offset centre Ctr" that is offset from the centre Ctr of the touch area A of the second contact point 1041 so that the second touch point 200b is shifted to a second offset position in alignment with the second offset centre Ctr".

Figure 10A:
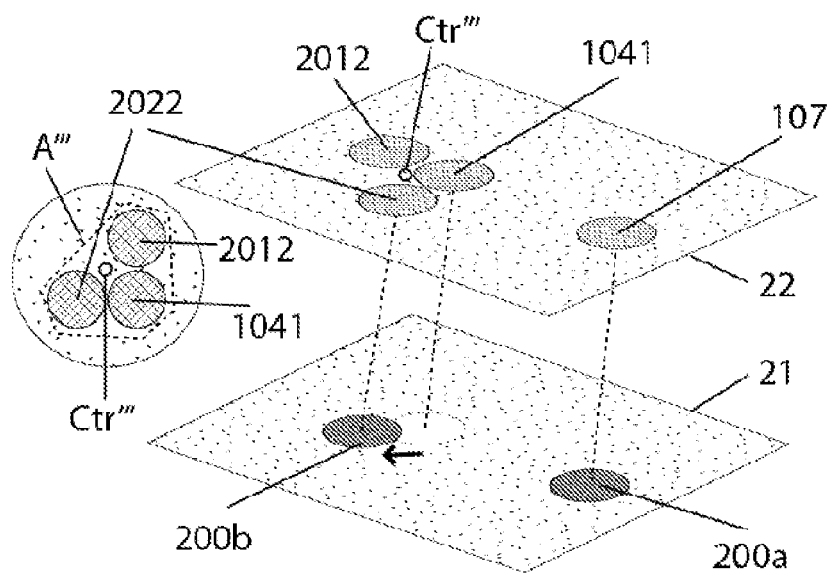
FIGS. 10a-10b show the touch points detected on the screen by the touch-sensitive device when all actuating members are pressed down by a user.
Figure 10B:
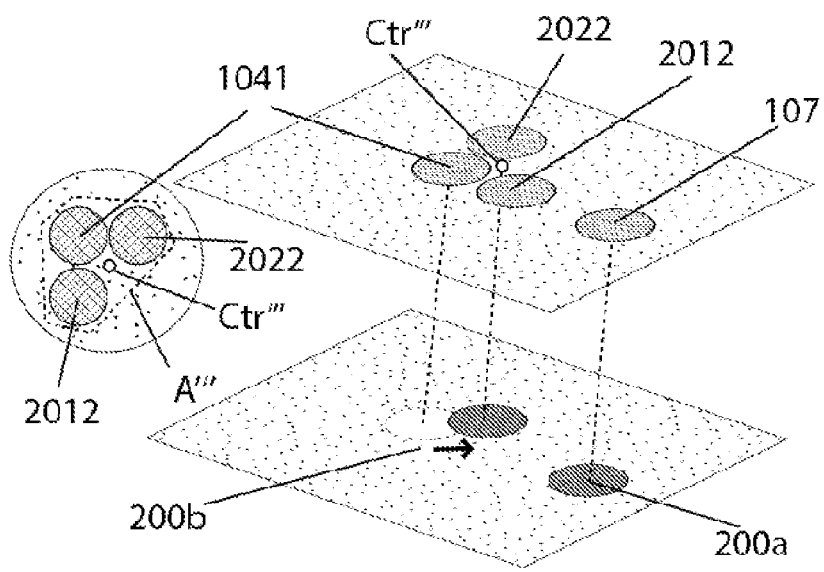

FIGS. 10a and 10b show a plurality of arrangement of contact points 2012 and 2022 in relation to the positions of contact points 107 and 1041. When the first, second, third and fourth contact points 107, 1041, 2012, 2022 are in contact with the touch-sensitive layer 22, the second, third and fourth contact points 1041, 2012, 2022 can be recognized as one contact point and produce a third combined touch area A''' on the touch-sensitive layer 22 having a third offset centre Ctr''' that is offset from the centre Ctr of the touch area A of the second contact point 1041 so that the second touch point 200b is shifted to a third offset position in alignment with the third offset centre Ctr''', as shown by the arrows in FIGS. 10a and 10b.

The four contact points 107, 1041, 2012, 2022 are not necessary to be aligned in a straight line and may be arranged in any possible positions. When all contact points 107, 1041, 2012, 2022 are touching the touch sensitive layer 22, the three contact points 1041, 2012 and 2022 will be recognized as one contact point with a larger touch area A''' and its designated offset position will be the centre Ctr''' of the touch area A'''.

Each actuating assembly 201, 202 can be pressed solely, or in different orders, or simultaneously to form a variety of commands and data input.

When the pointing device 100 is placed on the screen at the default state where only the first and second contact points 107, 1041 are in contact with the touch-sensitive layer 22, the first and second touch points 200a, 200b will be generated on the screen 21 respectively.

When a user presses only the first actuating assembly 201, the third contact point 2012 will be in contact with the touch-sensitive layer 22 and the second touch point 200b will be shifted to the first offset position. Also, when a user presses only the second actuating assembly 202, the fourth contact point 2022 will be in contact with the touch-sensitive layer 22 and the second touch point 200b will be shifted to the second offset position.

When a user presses the first and second actuating assemblies 201, 202 simultaneously, the third and fourth contact points 2012, 2022 will be in contact with the touch-sensitive layer 22 respectively, and the second touch point 200b will be shifted to the third offset position.

Furthermore, the user may (i) press the first actuating assembly 201 first so that the third contact point 2012 is in contact with the touch-sensitive layer 22 to thereby shift the second touch point 200b to the first offset position; and then (ii) press the second actuating assembly 202 so that the fourth contact point 2022 is also in contact with the touch-sensitive layer 22 to thereby shift the second touch point 200b from the first offset position to the third offset position.

In another way, the user may (i) press the second actuating assembly 202 first so that the fourth contact point 2022 is in contact with the touch-sensitive layer 22 to thereby shift the second touch point 200b to the second offset position; and then (ii) press the first actuating assembly 201 so that the third contact point 2012 is also in contact with the touch-sensitive layer 22 to thereby shift the second touch point 200b from the second offset position to the third offset position.

The method may further include the steps of determining and recording positions of the first and second touch points, determining a change in displacement of the second touch point, determining a distance between the first and second touch points, comparing a value of the distance with a list of preset values stored in a data file, and triggering a command if the value of the distance matches a preset value. Details of these further steps have been described in the previous embodiment.

Although it has been shown and described that there are two movable contact points 2012, 2022, it is understood by one skilled in the art that there can be three or more movable contact points provided on the pointing device. Similarly, three or more movable contact points can form different combined touch areas having different offset centers based on the order of corresponding actuating assemblies being fully depressed. They can be pressed solely, or in different orders, or together with other actuating members simultaneously to form a variety of commands and data input.

The touch-sensitive device can be an iPad, an iPhone, or any Android equipped touch-sensitive devices, or any touch-sensitive devices equipped with other operating systems. It is contemplated that the pointing device disclosed in the present application can be compatible with all kinds of touch-sensitive devices, regardless of screen sizes or operating systems.

It may be appreciated that various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A pointing device for interacting with a touch-sensitive device comprising:
  a supporting member;
  a first contact point fixed on the supporting member and adapted to be in contact with a touch-sensitive layer and generate a first touch point on a screen underneath the touch-sensitive layer;
  a second contact point fixed on the supporting member and spaced laterally apart from the first contact point and adapted to be in contact with the touch-sensitive layer and generate a second touch point on the screen;
  a third contact point mounted on the supporting member and movable by a first actuating assembly from a default state where only the first and second contact points are in contact with the touch-sensitive layer to its fully depressed state where the third contact point is also in contact with the touch-sensitive layer adjacent to the second contact point; and a fourth contact point mounted on the supporting member and movable by a second actuating assembly from the default state where only the first and second contact points are in contact with the touch-sensitive layer to its fully depressed state where the fourth contact point is also in contact with the touch-sensitive layer adjacent to the second contact point.

2. The pointing device as claimed in claim 1, wherein the first actuating assembly comprises:

a first actuating member provided on a first raised platform of the supporting member, and having an upper end provided with a first actuating button and a lower end coupled with the third contact point disposed below the first raised platform; and a first biasing member mounted on the first actuating member and held between the first actuating button and the first raised platform for biasing the third contact point underneath the first raised platform;

whereby when a force is exerted on the first actuating button against biasing force of the first biasing member, the third contact point moves to its fully pressed state.

3. The pointing device as claimed in claim 2, wherein the first actuating member comprises a first shaft passing through a first opening formed on the first raised platform.

4. The pointing device as claimed in claim 2, wherein the first biasing member is a coil spring.

5. The pointing device as claimed in claim 1, wherein the second actuating assembly comprises:

a second actuating member provided on a second raised platform of the supporting member, and having an upper end provided with a second actuating button and a lower end coupled with the fourth contact point disposed below the second raised platform; and a second biasing member mounted on the second actuating member and held between the second actuating button and the second raised platform for biasing the fourth contact point underneath the second raised platform;

whereby when a force is exerted on the second actuating button against biasing force of the second biasing member, the fourth contact point moves to its fully pressed state.

6. The pointing device as claimed in claim 5, wherein the second actuating member comprises a second shaft passing through a second opening formed on the second raised platform.

7. The pointing device as claimed in claim 5, wherein the second biasing member is a coil spring.

8. The pointing device as claimed in claim 1, wherein a plurality of changes in displacement of the second touch point relative to the first touch point defines a variety of patterns of movements which are detected and recognized by the touch-sensitive device.

9. The pointing device as claimed in claim 1, further comprising at least one additional contact point mounted on the supporting member and movable by at least one additional actuating assembly from the default state where only the first and second contact points are in contact with the touch-sensitive layer to its fully depressed state where the at least one additional contact point is also in contact with the touch-sensitive layer adjacent to the second contact point.

10. The pointing device as claimed in claim 1, wherein when the first, second and third contact points are in contact with the touch-sensitive layer, the second and third contact points are recognized as one contact point and produce a first combined touch area on the touch-sensitive layer having a first offset centre that is offset from a centre of a touch area on the touch-sensitive layer of the second contact point so that the second touch point is shifted to a first offset position in alignment with the first offset centre.

11. The pointing device as claimed in claim 10, wherein when the first, second and fourth contact points are in contact with the touch-sensitive layer, the second and fourth contact points are recognized as one contact point and produce a second combined touch area on the touch-sensitive layer having a second offset centre that is offset from the centre of the touch area of the second contact point so that the second touch point is shifted to a second offset position in alignment with the second offset centre.

12. A method for interacting with the touch-sensitive device using the pointing device of claim 10, comprising the step of placing the pointing device on the screen at the default state where only the first and second contact points are in contact with the touch-sensitive layer to thereby generate the first and second touch points on the screen respectively.

13. The method as claimed in claim 12, comprising the step of pressing the first actuating assembly so that the third contact point is in contact with the touch-sensitive layer to thereby shift the second touch point to the first offset position.

14. The method as claimed in claim 12, further comprising the steps of determining and recording positions of the first and second touch points, determining a change in displacement of the second touch point, determining a distance between the first and second touch points, comparing a value of the distance with a list of preset values stored in a data file, and triggering a command if the value of the distance matches a preset value.

15. A method for interacting with the touch-sensitive device using the pointing device of claim 11, wherein when the first, second, third and fourth contact points are in contact with the touch-sensitive layer, the second, third and fourth contact points are recognized as one contact point and produce a third combined touch area on the touch-sensitive layer having a third offset centre that is offset from the centre of the touch area of the second contact point so that the second touch point is shifted to a third offset position in alignment with the third offset centre; and wherein the method comprises the step of placing the pointing device on the screen at the default state where only the first and second contact points are in contact with the touch-sensitive layer to thereby generate the first and second touch points on the screen respectively.

16. The method as claimed in claim 15, further comprising the step of pressing the second actuating assembly so that the fourth contact point is in contact with the touch-sensitive layer to thereby shift the second touch point to the second offset position.

17. The method as claimed in claim 15, further comprising the step of pressing the first and second actuating assemblies simultaneously so that the third and fourth contact points are in contact with the touch-sensitive layer respectively to thereby shift the second touch point to the third offset position.

18. The method as claimed in claim 15, further comprising the steps of (i) pressing the first actuating assembly so that the third contact point is in contact with the touch-sensitive layer to thereby shift the second touch point to the first offset position; and then (ii) pressing the second actuating assembly so that the fourth contact point is in contact with the touch-sensitive layer to thereby shift the second touch point from the first offset position to the third offset position.

19. The method as claimed in claim 15, further comprising the steps of (i) pressing the second actuating assembly so that the fourth contact point is in contact with the touch-sensitive layer to thereby shift the second touch point to the second offset position; and then (ii) pressing the first actuating assembly so that the third contact point is in contact with the touch-sensitive layer to thereby shift the second touch point from the second offset position to the third offset position.

* * * * *